(12) United States Patent
Godfrey et al.

(10) Patent No.: US 7,541,970 B1
(45) Date of Patent: Jun. 2, 2009

(54) WEATHER RADAR WITH SPURIOUS REFLECTION LOBE MITIGATION

(75) Inventors: Mark B. Godfrey, Melbourne, FL (US); Daniel L. Woodell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/513,983

(22) Filed: Aug. 31, 2006

(51) Int. Cl.
*G01S 13/95* (2006.01)
*G01S 7/40* (2006.01)
*G01S 13/00* (2006.01)
*H01Q 1/42* (2006.01)

(52) U.S. Cl. ............... 342/173; 342/26 R; 342/26 B; 342/89; 342/91; 342/165; 342/175; 342/176; 342/182; 342/195; 343/872

(58) Field of Classification Search ............ 343/872, 343/873; 342/26 R–26 D, 82–103, 159–186, 342/195, 149

See application file for complete search history.

(56) References Cited

U.S. PATENT DOCUMENTS

| | | | | |
|---|---|---|---|---|
| 2,952,296 A | * | 9/1960 | Kofoid | 342/173 |
| 3,267,467 A | * | 8/1966 | Gerardin et al. | 342/160 |
| 3,316,549 A | * | 4/1967 | Hallendorff | 343/872 |
| 3,396,395 A | * | 8/1968 | Ball et al. | 342/149 |
| 3,781,878 A | | 12/1973 | Kirkpatrick | |
| 3,885,237 A | | 5/1975 | Kirkpatrick | |
| 3,940,767 A | * | 2/1976 | DeLano et al. | 343/872 |
| 4,092,644 A | * | 5/1978 | Hodge | 342/26 B |
| 4,097,796 A | * | 6/1978 | Lunden | 342/165 |
| 4,486,756 A | * | 12/1984 | Peregrim et al. | 342/149 |
| 4,528,565 A | * | 7/1985 | Hauptmann | 342/91 |
| 4,633,254 A | * | 12/1986 | Giaccari | 342/91 |
| 4,649,394 A | * | 3/1987 | Minker et al. | 342/94 |
| 5,198,819 A | | 3/1993 | Susnjara | |
| 5,485,159 A | * | 1/1996 | Zhang et al. | 342/165 |
| 5,648,782 A | * | 7/1997 | Albo et al. | 342/26 D |
| 5,920,276 A | | 7/1999 | Frederick | |
| 5,945,926 A | | 8/1999 | Ammar et al. | |
| 5,973,635 A | * | 10/1999 | Albo | 342/26 D |
| 6,154,169 A | | 11/2000 | Kuntman | |
| 6,184,816 B1 | | 2/2001 | Zheng et al. | |
| 6,201,494 B1 | | 3/2001 | Kronfeld | |
| 6,236,351 B1 | | 5/2001 | Conner et al. | |
| 6,340,946 B1 | | 1/2002 | Wolfson et al. | |
| 6,388,607 B1 | | 5/2002 | Woodell | |
| 6,388,608 B1 | | 5/2002 | Woodell et al. | |
| 6,414,623 B1 | * | 7/2002 | Ashihara | 342/173 |
| 6,424,288 B1 | | 7/2002 | Woodell | |
| 6,603,425 B1 | | 8/2003 | Woodell | |
| 6,677,886 B1 | * | 1/2004 | Lok | 342/26 R |
| 6,686,872 B2 | * | 2/2004 | Vacanti | 342/173 |
| 6,954,172 B2 | * | 10/2005 | Hofmann et al. | 342/173 |
| 6,958,725 B1 | * | 10/2005 | Price et al. | 342/173 |

* cited by examiner

*Primary Examiner*—Bernarr E Gregory

(57) ABSTRACT

A weather radar system is capable of mitigating the effects of spurious reflections caused by a reflection lobe. Processing electronics can be used to sense weather and to identify spurious reflections caused by the reflection lobe. The reflection lobe can be caused by antennae or radome characteristics. The weather radar system can include a display that provides visual indicia of the weather with mitigation of the spurious reflections.

20 Claims, 12 Drawing Sheets

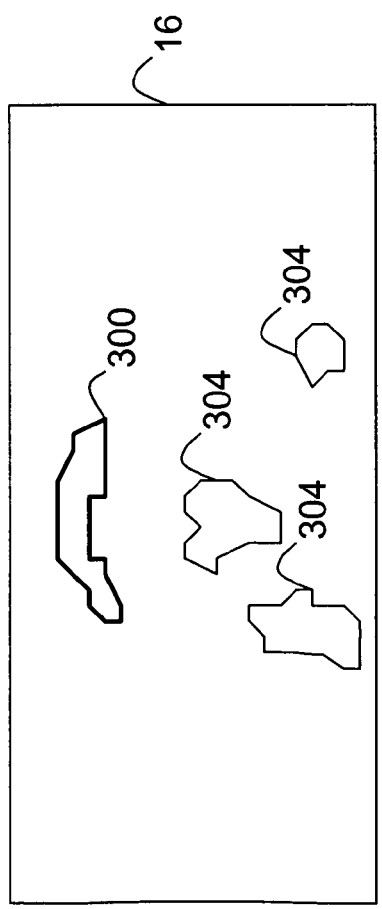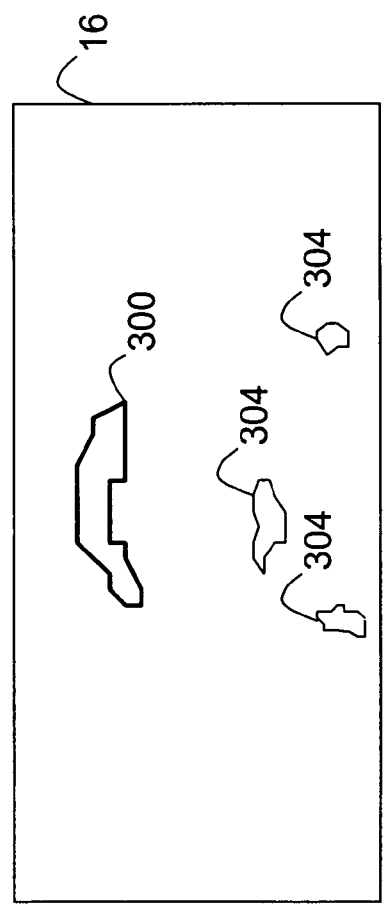
Figure 6
Figure 7

US 7,541,970 B1

WEATHER RADAR WITH SPURIOUS REFLECTION LOBE MITIGATION

FIELD OF THE INVENTION

The present application relates generally to the identification of weather and/or monitoring of weather detector equipment. More particularly, the present application relates to a method of and a system for mitigating spurious signals due to reflection lobes and side lobes and/or the monitoring of radome and antenna characteristics.

BACKGROUND OF THE INVENTION

U.S. Pat. No. 6,424,288 invented by Daniel L. Woodell and assigned to the assignee of the present application discloses systems for and methods of displaying radar information using weather radar systems. Weather radar systems generally include an antenna, a receiver/transmitter circuit, a processor, and display. The antenna is generally housed in shell-like structure, often referred to as a radome. The processor is coupled between the display and the receiver/transmitter circuit. The receiver/transmitter circuit is coupled between the processor and the antenna.

The processor provides transmit signals through the receiver/transmitter circuit to the antenna to transmit radar beams. The processor receives radar return signals derived from radar returns received by the antenna. The radar return signals are provided to the processor via the receiver/transmitter circuit.

Conventionally, pilots use weather radar systems to detect and avoid hazardous weather. The radar return signals are processed to provide graphical images to a radar display. The radar display is typically a color multi-function display (MFD) unit that provides color graphical images to represent the severity and location of weather. Conventional weather radar systems include those manufactured by Rockwell Collins, Inc., Honeywell International, Inc. and others.

Weather radar systems can be susceptible to spurious radar returns associated with radome and antenna characteristics. More particularly, certain radome and antenna designs can cause spurious signals related to reflection lobes and side lobes. Generally, the antenna is not the problem as it is specified and built to avoid spurious responses. In addition, radome damage and its subsequent repair can cause spurious signals related to reflection lobes and side lobes.

Spurious radar returns produced by reflection lobes and side lobes associated with the aircraft radome or the radar antenna can produce misleading display graphics that show non-existence weather (e.g., thunderstorm cells) close to the aircraft. These misleading graphics often cause operators and pilots to claim that the weather radar electronics are malfunctioning when the problem may instead be related to the radar antenna or radome. Removing electronics that are not the source of a problem is an extremely wasteful and expensive process.

Accordingly, there is a need to identify spurious reflections caused by antennas and radomes. Further, there is a need to provide a warning to an operator or pilot when spurious reflections caused by reflection lobes and side lobes are adversely affecting the operation of the weather radar system.

There is another need for a method that determines whether the radome is interfering with the radar performance. There is also a need for a system for and a method of mitigating spurious reflections due to radome characteristics. Further still, there is a need for real time or pseudo-real time detection of spurious reflections due to reflection lobes and side lobes associated with the radome. Yet further, there is a need for a weather radar system optimized to more accurately display weather. Yet further still, there is a need for a system that automatically warns when radome quality is below expectations and/or automatically mitigates for spurious reflections due to reflection lobes and side lobes. Even further still, there is a need for weather radar system that does not display spurious reflections due to radome characteristics.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An exemplary embodiment relates to a weather radar system. The weather radar system includes processing electronics for sensing weather and a display. The processing electronics identifies spurious reflections caused by a side lobe reflection and/or a reflection lobe. The display provides visual indicia of the weather with mitigation of the spurious reflections in response to the processing electronics, provides a warning that the spurious reflections are adversely affecting weather radar performance or provides both the mitigation and the warning.

Another exemplary embodiment relates to a method of displaying weather on a display. The display is associated with an aircraft weather radar system. The method includes receiving radar returns at a plurality of tilt angles and processing the radar returns to determine a presence of weather and to perform at least one of: mitigating the effects of spurious returns caused by reflection lobes and/or side lobes, providing a warning or both mitigating and providing the warning. The method also includes displaying the weather.

Still another exemplary embodiment relates to an apparatus for displaying weather for an aircraft. The apparatus includes means for transmitting radar signals and receiving radar returns, means for providing weather radar derived from the weather radar returns, and means for determining spurious reflections due to side lobe and/or reflection lobes associated with the means for transmitting.

In another embodiment, the apparatus can also includes means for removing data associated with the spurious reflections from the weather data, means for providing a display signal associated with the weather data, and a means for displaying an image representing the weather in response to the display signal. In one embodiment, the system can be configured to disqualify or warn when the radome/antenna system produces spurious lobe levels at too high of level.

BRIEF DESCRIPTION OF THE DRAWINGS

The invention will become more fully understood from the following detailed description, taken in conjunction with the accompanying drawings, wherein like reference numerals refer to like elements, in which:

FIG. 6 is a schematic drawing of a weather radar display for the system illustrated in FIG. 1 in accordance with another exemplary embodiment;

FIG. 7 is a schematic drawing of a weather radar display for the system illustrated in FIG. 1 in accordance with yet another exemplary embodiment;

DETAILED DESCRIPTION OF THE PREFERRED EMBODIMENTS

Figure 1:
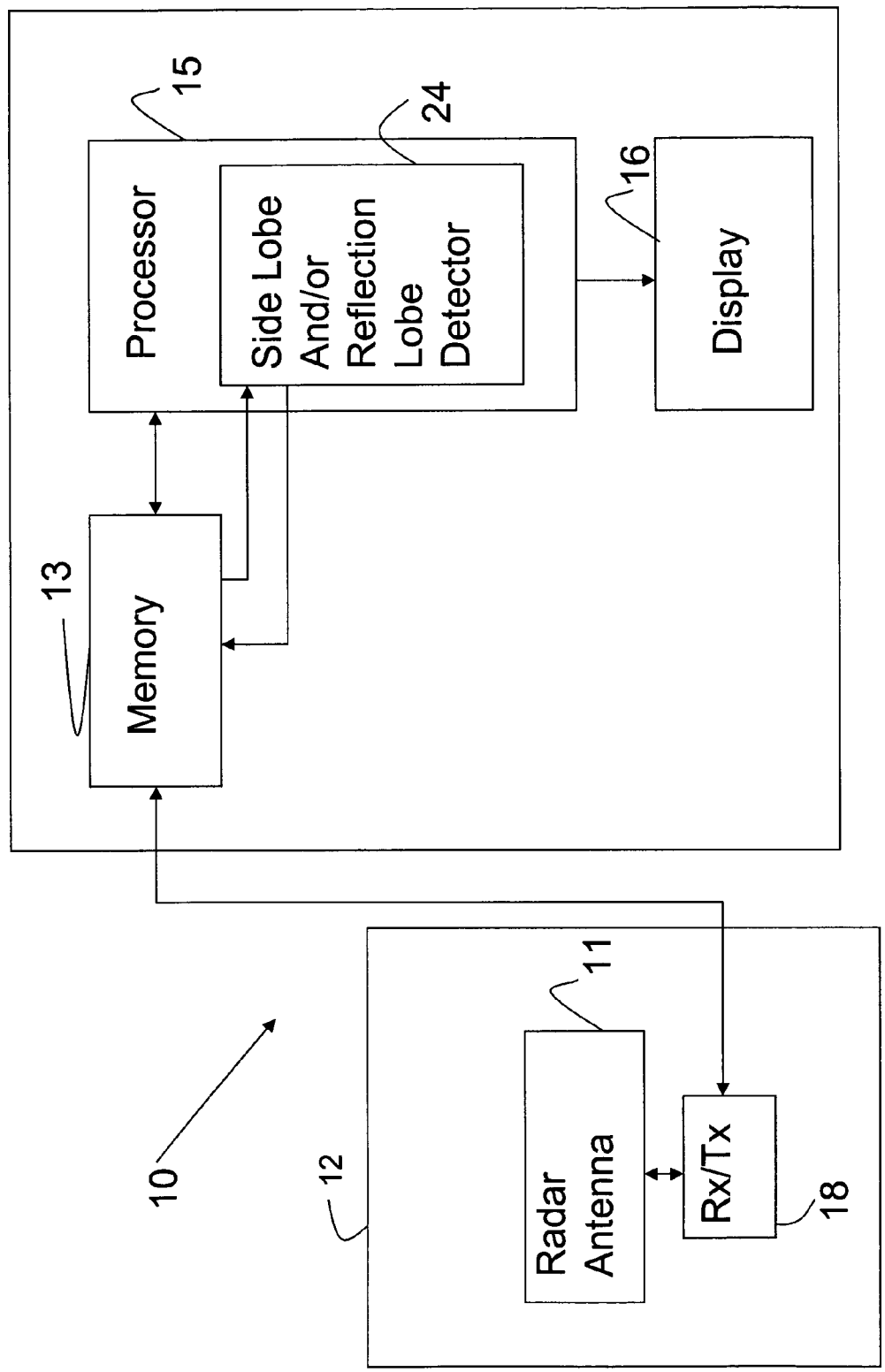
FIG. 1 is a general block diagram of a weather radar system in accordance with an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring now to FIG. 1, a weather radar system 10 which may be used on an aircraft is depicted. System 10 can be similar to the avionics weather radar systems described in U.S. Pat. Nos. 6,603,425 and 6,388,608. In one embodiment, system 10 is a multi-scan system manufactured by Rockwell Collins, Inc. and configured to include a side lobe or reflection lobe detector 24. Alternatively, other multi-scanning radars including a volumetric scanning system manufactured by Honeywell, Inc. as well as non-multi-scanning radar could be configured to include detector 24 without departing from the scope of the invention.

Avionics weather radar system is generally designated 10 and includes a weather radar receiver/transmitter 18, a weather radar adjustable antenna 11, a processor 15, and a memory 13. System 10 also includes a tilt control for automatically controlling the tilt angle (mechanical or electronic) of the antenna 11; this auto control may include an additional manual control feature as well.

The data in memory 13 (e.g., a multi-scan, multi-tilt angle storage unit) can be used by detector 24 to determine weather that should be displayed on display 16. Memory 13 can be any storage device for storing data including volumetric memory, flash memory, disc drives, etc. Display 16 can be part of an avionic multi-function display (MFD) unit. Preferably, processor 15 processes weather radar returns to identify or sense the presence of weather in front of or in view of the aircraft.

Processor 15 can be programmed as a multi-scan, multi-tilt angle, weather radar processing unit and can perform the customary functions performed by a conventional weather radar return processing unit, plus it can perform several additional operations based upon the additional data available in memory 13. In general, multi-scan, multi-tilt angle processor 15 can merge or cross qualify portions, or ranges, of the radar returns of several different antenna sweeps at several different tilt angles, so that a single relatively clutter-free image is presented to the pilot based upon the several separate scans. Alternatively, voxel based systems and non-multi-scan radar systems can utilize the principles of the present invention without departing from the scope of the claims.

Figure 2:
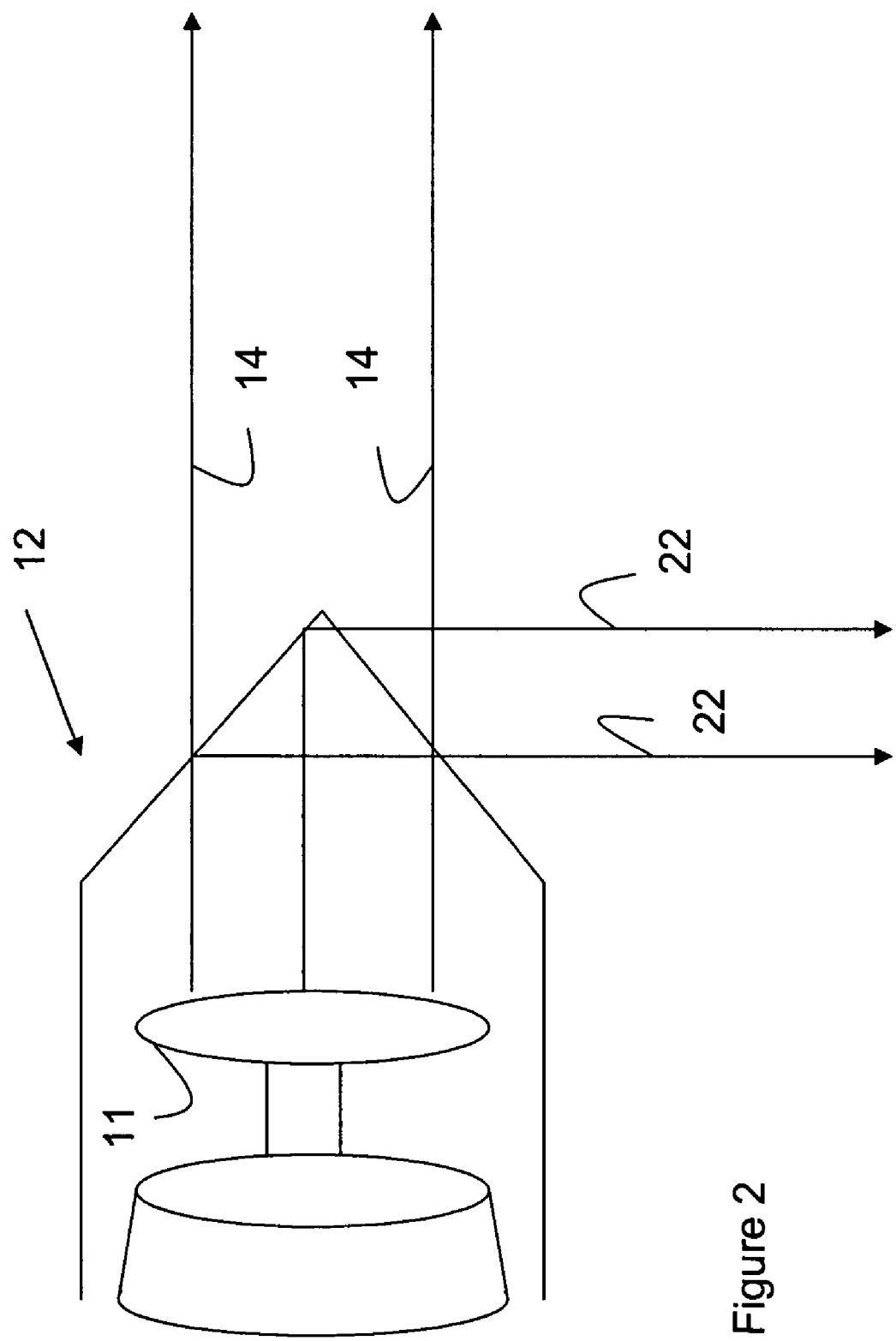
FIG. 2 is a more detailed general block diagram of a radome for the weather radar system illustrated in FIG. 2 in accordance with another exemplary embodiment.

With reference to FIG. 2, radar antenna 11 and receiver transmitter circuit 18 can be located in a radome 12. Primary transmitted radar beams 14 are provided via antenna 11 through radome 12. Reflected or secondary beams 22 can also be produced due to characteristics of radome 12 (or antenna 11). Radome 12 acts like an optical beam splitter and creates secondary beams 22. The characteristics of radome 12 can affect the angle at which secondary beams 22 are provided. These characteristics can include characteristics due to repairs on radome 12, alignment of radome 12, damage to radome 12, materials associated with radome 12, etc. Many factors can affect the angle at which secondary beams 22 are provided from radome 12. Reflection lobes occur in almost all cases, the only variable is their strength.

Although secondary beams 22 are shown in a 90 degree angle orientation with respect to beam 14 in FIG. 2, secondary beams 22 are often provided over a variety of angles. Secondary beams 22 reflect off of other objects, such as the surface of the earth and are received as radar returns having a range that is often related to the altitude of system 10. In conventional systems, these returns associated with secondary beams 22 are spurious signals that often result in inaccurate graphical images being provided on display 16 of system 10. The spurious signals from beams 22 are generally side lobes and lobe reflections (although only a reflection lobe is shown in FIGS. 2 and 3B).

Figure 3A:
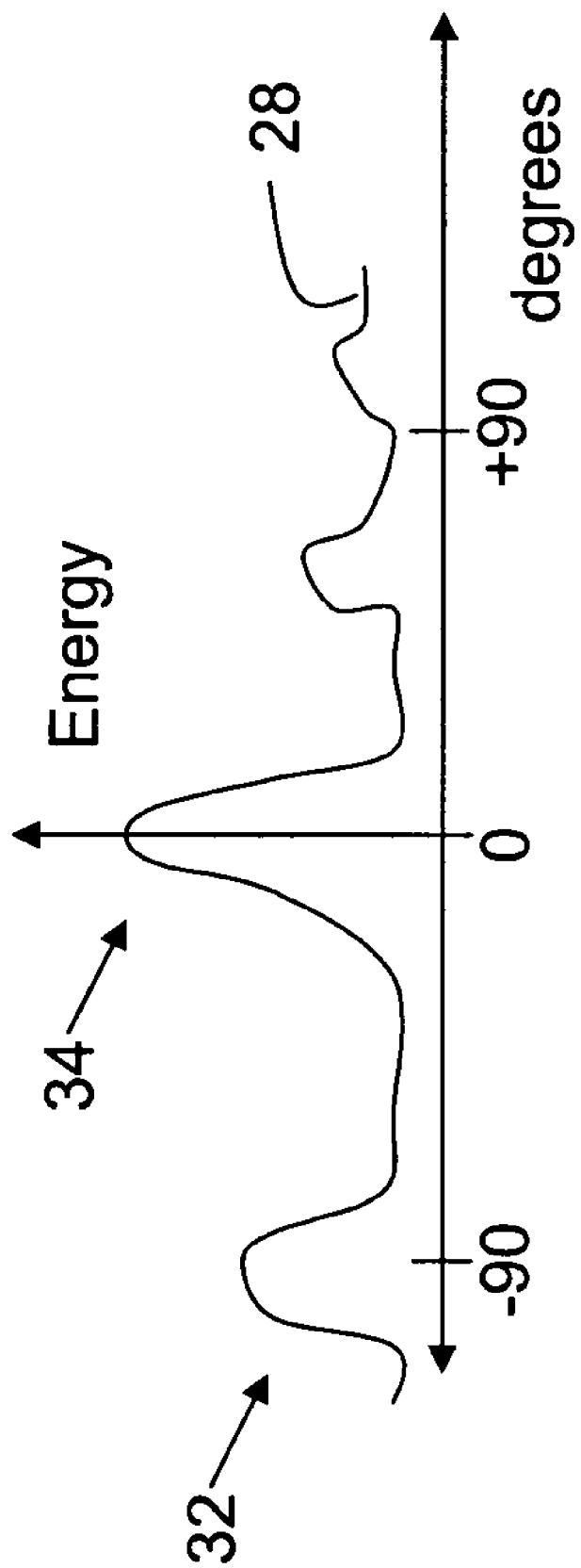
FIG. 3A is a waveform diagram showing energy versus angle of transmission from the radome illustrated in FIG. 2.
Figure 3B:
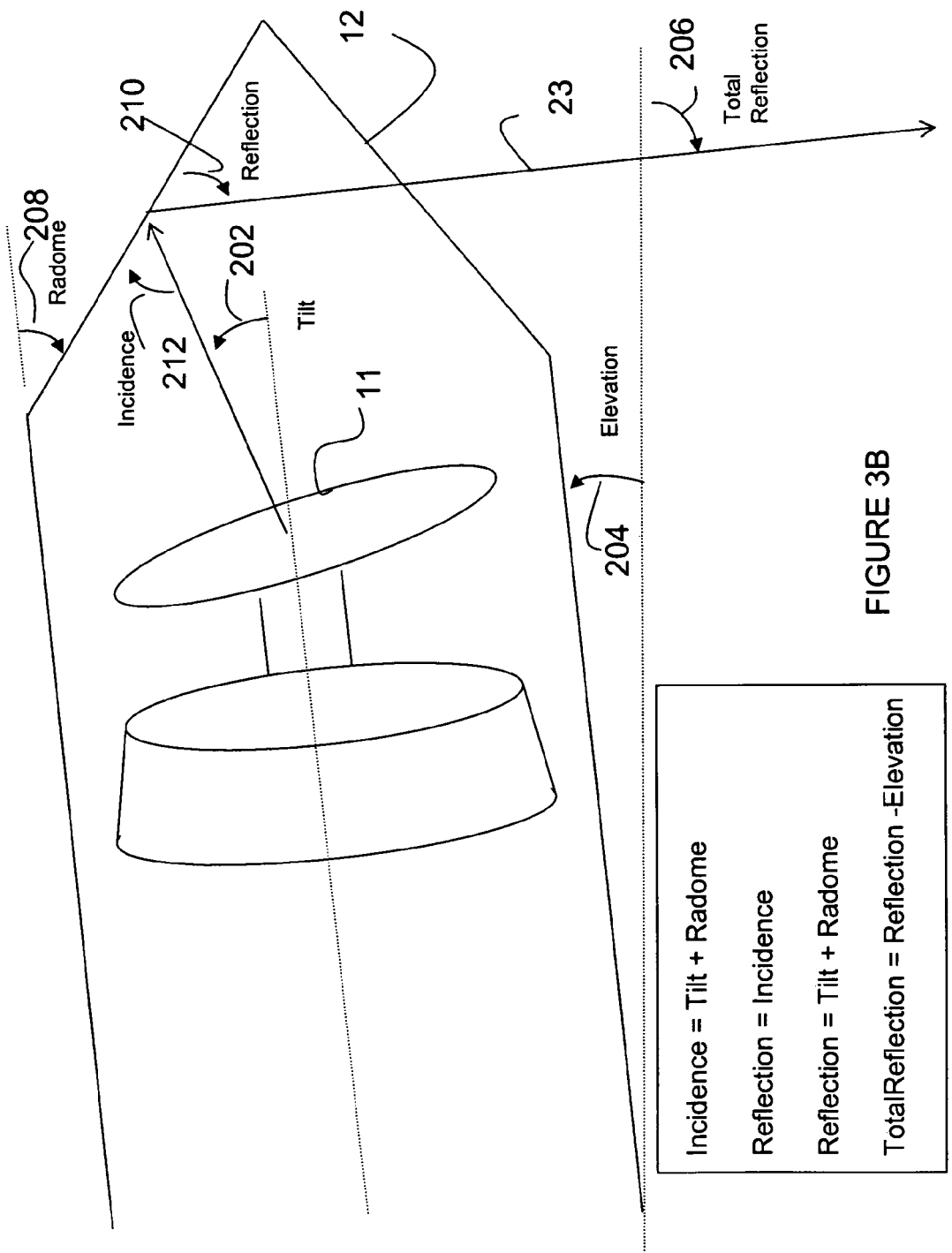
FIG. 3B is a more detailed block diagram of the radome illustrated in FIG. 2 showing angles of incidences, elevation, tilt, reflection and total reflection.

With reference to FIG. 3A, the energy associated with secondary beams 22 and primary beams 14 is generally represented by waveform 28. Waveform 28 is provided on a Y axis representing energy and an X axis representing reflection angle. Primary radar beams 14 are shown having peak energy 34 at a zero degree transmission angle, while reflected beams 22 can be represented at the non-zero reflection angle (peak 32 at −90 degrees or other areas along waveform 28). Peak 32 can be the result of a reflection lobe or a side lobe reflection and cause spurious signals in system 10.

Detector 24 advantageously detects the presence of spurious signals caused by reflection lobes. Reflection lobes are generally due to construction of radome 12 operating as a beam splitter and tend to be farther away from main beam 14 than sidelobes which tend to be related to pointing angle and are closer to primary beams 14.

Detector 24 advantageously can provide a warning when the spurious signals are above a particular threshold. The threshold can be chosen so that the warning indicates that the spurious signals are large enough to adversely affect performance of system 10. The threshold can be a set fixed value, can be dependent upon altitude, transmission power or other characteristics. In one embodiment, the threshold is determined by graphical analysis of historical data as described below. Various techniques (e.g., using detection data tables referenced by range, azimuth angle, and/or radome angle using flashing identification techniques using Doppler identification techniques, etc.) can be used to determine when spurious signals are above a desired level without departing from the scope of the invention.

According to another embodiment, detector 24 advantageously mitigates the effects of reflection lobes. In one embodiment, the reflection lobes can be removed by detector 24. In another embodiment, the reflection lobes can be isolated to a region and weather for that isolated region can be inserted using a coasting algorithm as described in more detail below.

With reference to FIG. 3B, information associated with various angles associated with system 10 is useful when spurious signals are monitored. Radome 12 associated with antenna 11 is provided at an elevation angle 204 associated with the aircraft. In one embodiment, elevation angle 204 is the angle between a line parallel to the fuselage and a line parallel to ground. Antenna 11 is tilted at a tilt angle 202. Tilt angle 202 is with respect to a line parallel to the fuselage. Radome 12 is disposed at a radome angle 208 with respect to a line parallel to the fuselage. Although radome 12 is shown as a relatively flat surface in FIG. 3B, radome 12 often includes one or more curved surfaces.

A secondary beam 23 is provided at a reflection angle 210. A total reflection angle 206 for secondary beam 23 is equal to reflection angle 210 minus the elevation angle 204. An angle of incidence 212 is equal to tilt angle 202 plus radome angle 208. Incidence angle 212 is equal to reflection angle 210. Reflection angle 210 is also equal to tilt angle 202 plus radome angle 208.

Figure 4:
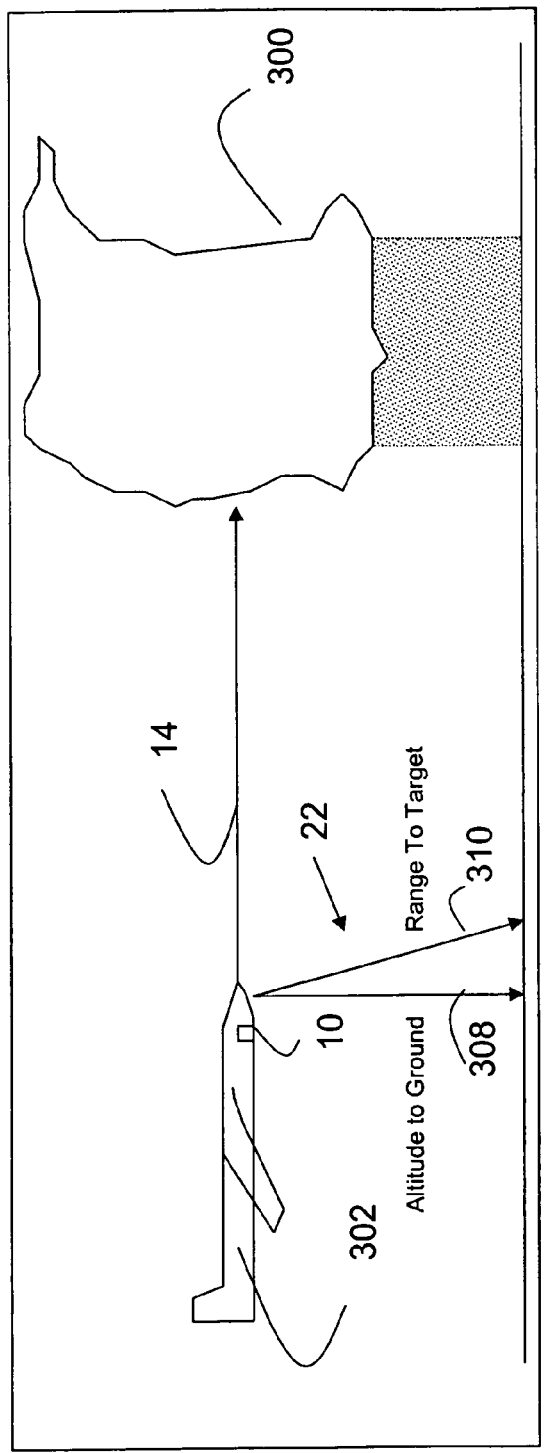
FIG. 4 is a schematic drawing showing an aircraft using the weather radar system illustrated in FIG. 1 in accordance with another exemplary embodiment.

With reference to FIGS. 3B and 4, an aircraft 302 includes system 10. System 10 receives energy from radar returns associated with primary radar beam 14 and reflections from secondary beam 22 or 23. Primary radar beam 14 can be utilized to ascertain the presence of weather 300.

The total reflection angle (angle 206) is equal to the ARCCOS (altitude to ground 308/range to target 310). Accordingly, the ARCCOS (altitude to ground 308/range to target 310) equals reflection angle 210 minus elevation angle 204 and ARCCOS (altitude to ground 308/range to target 310) equals tilt angle 202 plus radome angle 208 minus elevation angle 204. Radome angle 208 equals ARCCOS (altitude to ground 308/range to target 310) minus tilt angle 202 plus elevation angle 204. By solving for radome angle and storing percentage of detection with respect to radome angle, Applicants believe that an exemplary advantageous process can be used to detect spurious signals as described below with reference to FIGS. 10-13. In the preferred embodiment, use of radome angle allows reflection lobes to be consistently detected/located/predicted while the aircraft is climbing or descending which produces variations to elevation angle. The use of radome angle also allows consistent reflection lobe location with pilot or automatic antenna pointing stabilization inputs changing antenna incidence angle.

Figure 5:
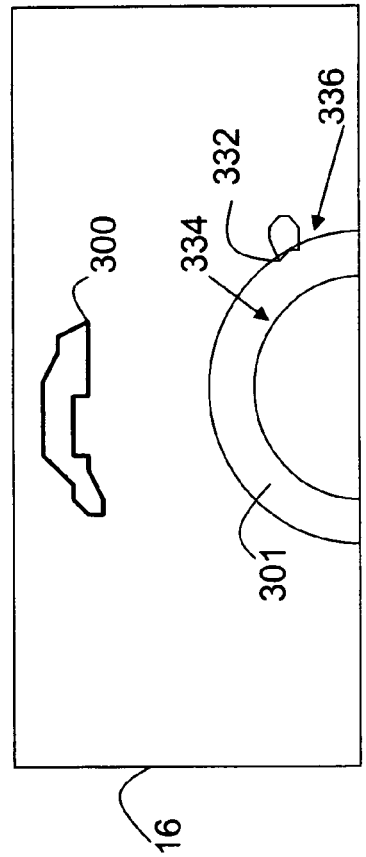
FIG. 5 is a schematic drawing of a weather radar display for the system illustrated in FIG. 1 in accordance with the exemplary embodiment.

With reference to FIG. 5, weather 300 is shown on display 16 as being in front of aircraft 302. An altitude band 304 represents a region associated with radar returns received from spurious reflections associated with secondary beam 22 or 23. Altitude band 304 has a range related to the altitude of the aircraft because the reflections from secondary beam 22 or 23 strike the surface of the Earth and bounce back to system 10 so that the range for such reflections is related to altitude. If the altitude of aircraft 302 changes, then the altitude band 201 associated with reflections from beam 22 also changes.

A spurious target 332 is shown on display 16. Reference 334 represents the range to ground under the aircraft such as range to target 310. Reference 336 represents the shortest range to spurious target for a particular reflection angle such as a range target 310.

With reference to FIG. 6, reflections do not often provide a straight altitude band and instead can provide only certain sections 304 in an area similar to altitude band 301 (FIG. 5). The showing of only certain sections 304 is due to the characteristics of radome 12 operating as a beam splitter. For example, the location of certain sections can be the result of incidence angle, tilt angle, local radome dielectric differences, etc. Altitude rings 304 are generally largest when beam 22 (FIG. 2) is normal to the ground. Reflection lobe returns and side lobe returns tend to be fuzzier than those produced by similar targets being illuminated by beam 14. Reflection lobe returns are generally fuzzier due to the many incidence angles that are produced as the reflection is placed in the near field. Accordingly, beam power tends to be spread in range. With reference to FIG. 7, alternative sections 304 are shown.

Figure 8:
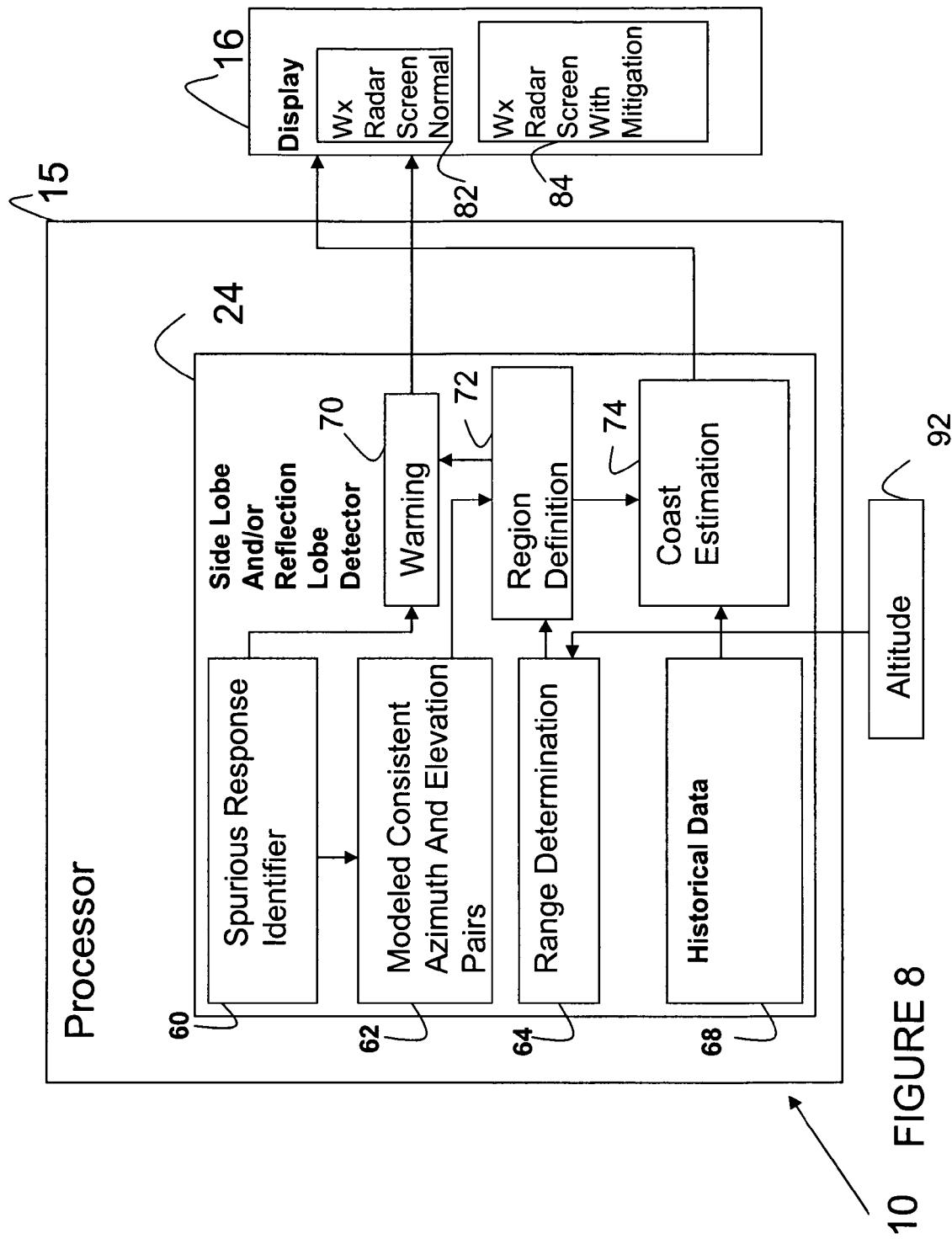
FIG. 8 is a more detailed block diagram of a process and display utilized in the system illustrated in FIG. 1 in accordance with still another embodiment.

With reference to FIG. 8, detector 24 is shown within processor 15. However, detector 24 can be a stand-alone processor card, computer or line replaceable unit separate from processor 15. In one embodiment, detector 24 can be entirely separate and can perform diagnostics on system 10. In such an embodiment, detector 24 can be used as part of a maintenance routine and can download historical data to determine if spurious signals are above a particular level. The historical data can be stored in a separate memory such as historical data module 68.

Figure 9:
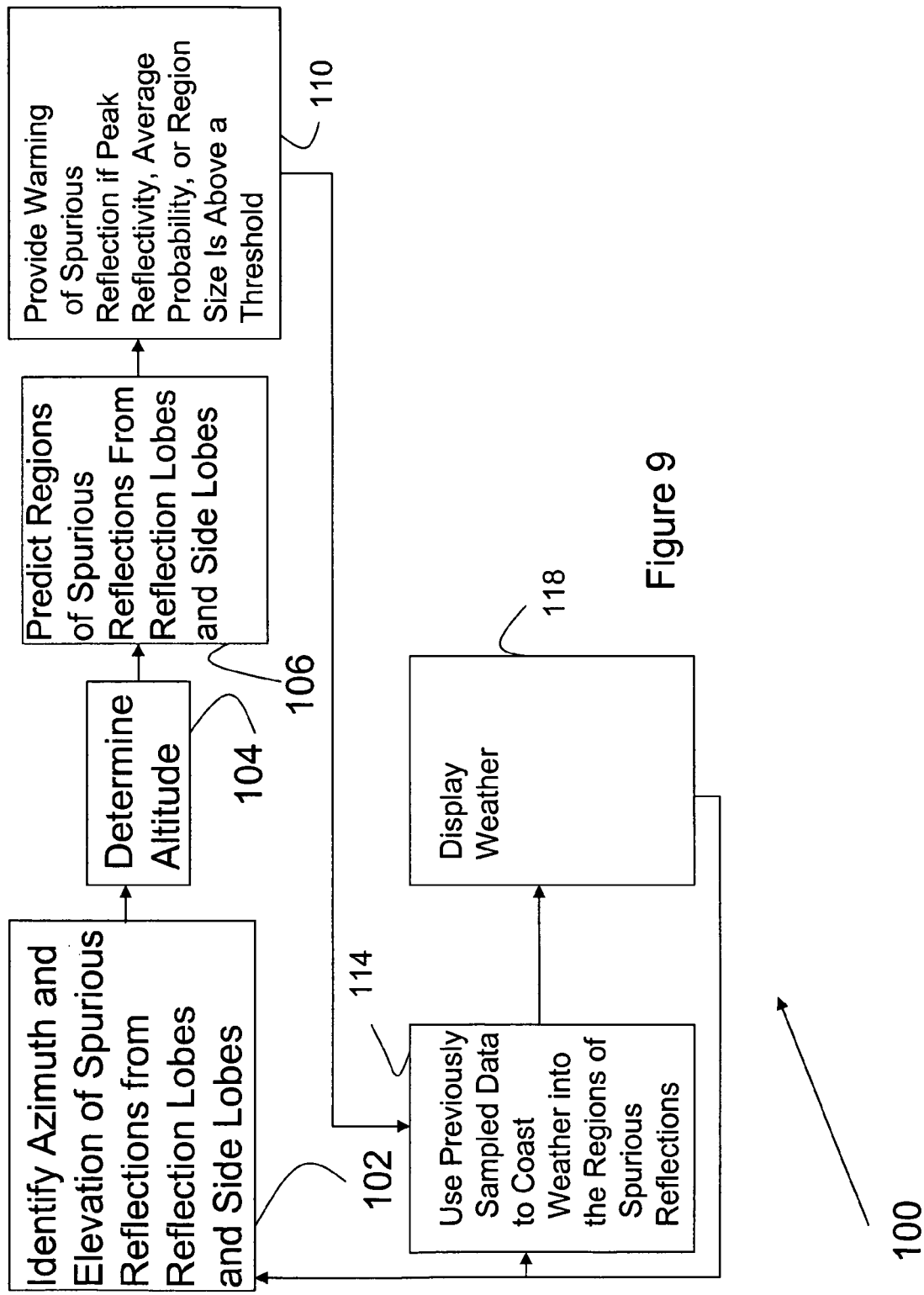
FIG. 9 is flow chart showing operation of the system illustrated in FIG. 1 in accordance with yet another exemplary embodiment.

With reference to FIG. 9, processor 15 operates according to flow chart 100 in an exemplary embodiment. At a step 100, spurious response identifier module 60 detects and identifies spurious signals from reflection lobes and side lobes. The spurious signals from reflection lobes and side lobes can be detected from a variety of techniques. In one embodiment, module 60 can identify spurious signals from at least one of these techniques: (1) flashing detection; (2) tracking logic; and (3) Doppler analysis. Module 60 can use an altitude value from sensor 92 to detect spurious signals.

Signals from reflection lobes and side lobes are fuzzier than reflections from beam 14. Returns from the surface of the Earth represent the reflection convolving with ground targets from scan time to scan time as the aircraft position translates. Accordingly, targets due to returns from the ground tend to come into the beam and fall out of the beam. Such targets can be detected using flashing detection.

Detection of spurious signals from side lobes and reflection lobes can also be accomplished by determining dynamic characteristics (e.g., whether the target has a translation that matches other airborne targets of cells). Targets at the surface of the Earth do not translate in the same manner as targets in front of the aircraft. Targets at the surface of the Earth tend to have the same range associated with the altitude of aircraft 302 or at least are a function of the altitude of aircraft 302. When aircraft 302 moves a certain distance, weather cells translate their position with respect to the airplane's velocity. However, the spurious signals due to reflection lobes do not translate in the same fashion.

Although reflections due to side lobes look more like reflections associated with main beams 14, those reflections do not translate identically to reflections from the main beams 14. By using cell identification and tracking logic and comparing the translation of those cells with other cells, spurious signals associated with reflection lobes and side lobes can be identified because the spurious signals translate consistently.

Since aircraft movement is generally mostly parallel to the surface of the earth, targets illuminated with the main beam will have higher closing velocities in flight than those targets move more normally underneath the aircraft that are illuminated by reflection lobes. This lower mean velocity can be used to differentiate targets in the reflection lobe from targets in the main beam. Therefore, module 60 can detect spurious signals due to reflection lobes through Doppler analysis. If the Doppler shift of a target is much lower than the other airborne targets, the target is more likely a result of a spurious signal from a reflection lobe.

Once spurious signals are identified by module 60, consistent azimuth and derived radome angle pairs are modeled in module 62. The modeled azimuth and radome angle pairs are utilized to identify a region associated with the spurious signals.

In addition, spurious response identifier module 60 determines that the spurious signals are above a threshold, a warning can be provided by warning module 70. Warning module 70 can provide an aural or visual warning on display 16. According to another embodiment, region definitions module 72 can provide an indication to warning circuit 70 if the area associated with the spurious signal is significantly large.

Region definition module 72 receives the azimuth and radome angle pairs associated with the spurious signals and a range associated with range determination module 64 to determine a volume associated with the spurious signals. The range determination module 64 utilizes altitude associated with an altitude sensor 92 to determine range.

Coast estimation module 74 utilizes the region definition from region definition module 72 and historical data from historical database 68 to provide a more accurate display on screen 64.

Coast estimation module 74 can completely reject or partially reject weather returns associated with the region. Module 74 can remove data associated with the region of the spurious signals. The removed data can be replaced by data from historical database 68 in accordance with a coast algorithm. The coast algorithm can be mechanized by modulating the updating process where new weather information is blended with the stored estimate of weather to produce a new stored weather estimate. The data produced from regions that are likely to be contaminated from the results of a spurious lobe can either not allowed to influence a new estimate of the weather situation or to have their influence reduced from normal operating methods. The new weather estimate can be stored either in a tessellated memory (pixels or voxels) or in an abstracted form such as a list of weather cells with their characteristics.

At a step 104, altitude is determined from altitude sensor 92. At a step 106, regions are predicted for spurious reflections from reflection lobes and side lobes by module 72. At a step 110, a warning can be provided if peak reflectivity, average probability or region size is above a threshold by module 70. At a step 114, previously sampled data can be utilized to coast or translate weather into the regions associated with this spurious reflections. At a step 118, weather is displayed on display 16. After step 118, system can return to step 102 or can return to step 114 depending upon if spurious regions need to be identified.

Display 110 preferably includes a normal mode weather radar screen 82 and a mitigation mode screen 84. In one embodiment, module 74 acts as a filter to prevent spurious radar returns associated with reflection lobe, from being displayed on display 110 when screen 84 is utilized.

In one embodiment, region detection module 72 utilizes a software routine or circuit for calculating the region of the spurious returns detected by identifier module 60 and removes weather images associated with those returns from on display 16. In addition, module 74 can adjust the symbology associated with region by using cross hatching, outlines, or other indicia can be utilized to indicate that the region includes removed reflections.

In a preferred embodiment, processor 24 and/or spurious response identifier model 60 utilizes a different technique for identifying spurious signals that are above a threshold. According to this preferred technique, system 10 generates a table to identify azimuth pairs and ranges as described above.

The table organized by azimuth and radome angle data can be filled with flight event data for the particular system 10 on aircraft 302. The event data allows prediction and modeling of consistent azimuth angle and radome angle pairs on an aircraft basis, thereby identifying spurious signal characteristics for a specific aircraft. The table provides a two-dimensional neighborhood of azimuth and radome angle in pairs and assigns a likelihood of the return being from a spurious signal due to a reflection lobe or side lobe. The likelihood could be determined by determining if the particular radome angle and azimuth pair identifies a weather target a certain percentage of time. Various statistical analysis can be determined using the likelihood to determine the likelihood.

In one embodiment, a Baysian rule base can be utilized to analyze the data in the table and determine a likelihood of the return being from a reflection lobe or a side lobe. This table can be continuously updated so that the table reflects changes in the performance of system 10 as aircraft 302 ages. In addition, an initial data set can be provided in the table at manufacture to reflect certain known characteristics associated with reflection lobes and side lobes for the particular aircraft installation. For example, if a certain radome design or aircraft type has particular characteristics at installation, those can be provided in the table initially.

In a preferred embodiment, processor 24 and/or spurious response identifier module 60 can generate a table utilizing azimuth angles and radome angles to identify spurious signals. According to this preferred technique, system 10 generates a database to identify azimuth angles and radome angles for detections. In one embodiment, the radome angles can be solved as described with reference to FIGS. 3B and 4 wherein the radome angle equals ARCCOS (altitude to ground 308/ range to target 310) minus tilt angle 202 plus elevation angle 204. By storing historical data based on percentage of detection, data associated with graphs 10-13 can be obtained. The data can be analyzed by any mathematical technique to determine the presence of spurious signals.

Figure 10:
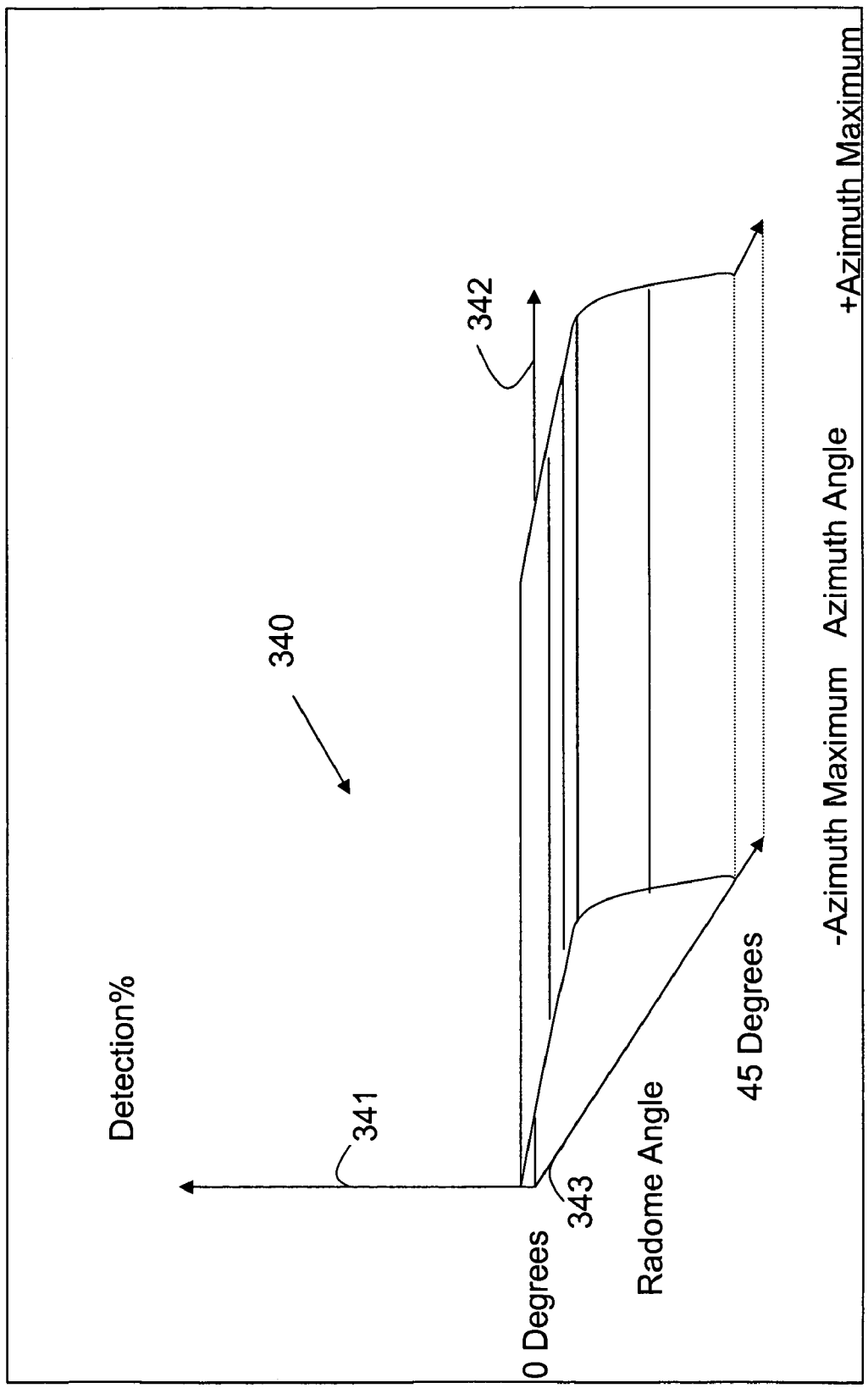
FIG. 10 is a graph showing detection percentages across radome angles and azimuth angles in accordance with an exemplary embodiment.

With reference to FIG. 10, graph 340 shows percentage detection across azimuth angle and radome angle. Graph 340 shows detection percentage on the Z axis 341, azimuth angle on the Y axis 342 and radome angle on the X axis 343. By plotting detection percentage versus azimuth angle and radome angle, a maximum can be detected associated with a reflection lobe. Graph 340 shows a normal response without significant spurious signals.

Figure 11:
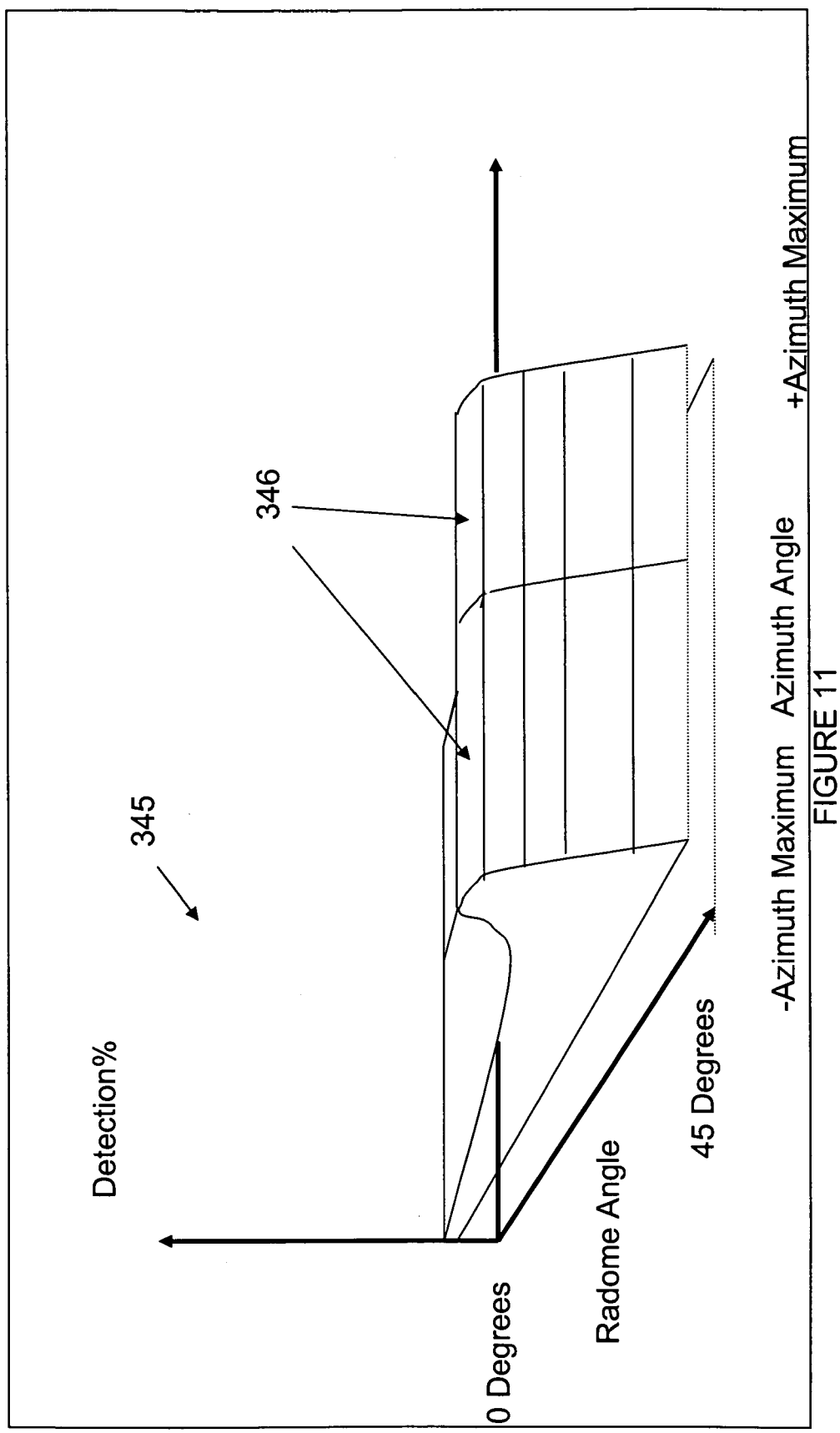
FIG. 11 is a graph showing detection percentages across radome angles and azimuth angles in accordance with an exemplary embodiment.

With reference to FIG. 11, a graph 345 is similar to graph 340 except that a ridge 346 of higher than expected detection rates is shown. Ridge 346 indicates a presence of a reflection lobe. Applicants believe that the detections associated with ridge 346 can generally produce an altitude ring. Significant local maximum detection can be used to determine a presence of the reflection lobe response or altitude ring response as shown in graph. 345.

Figure 12:
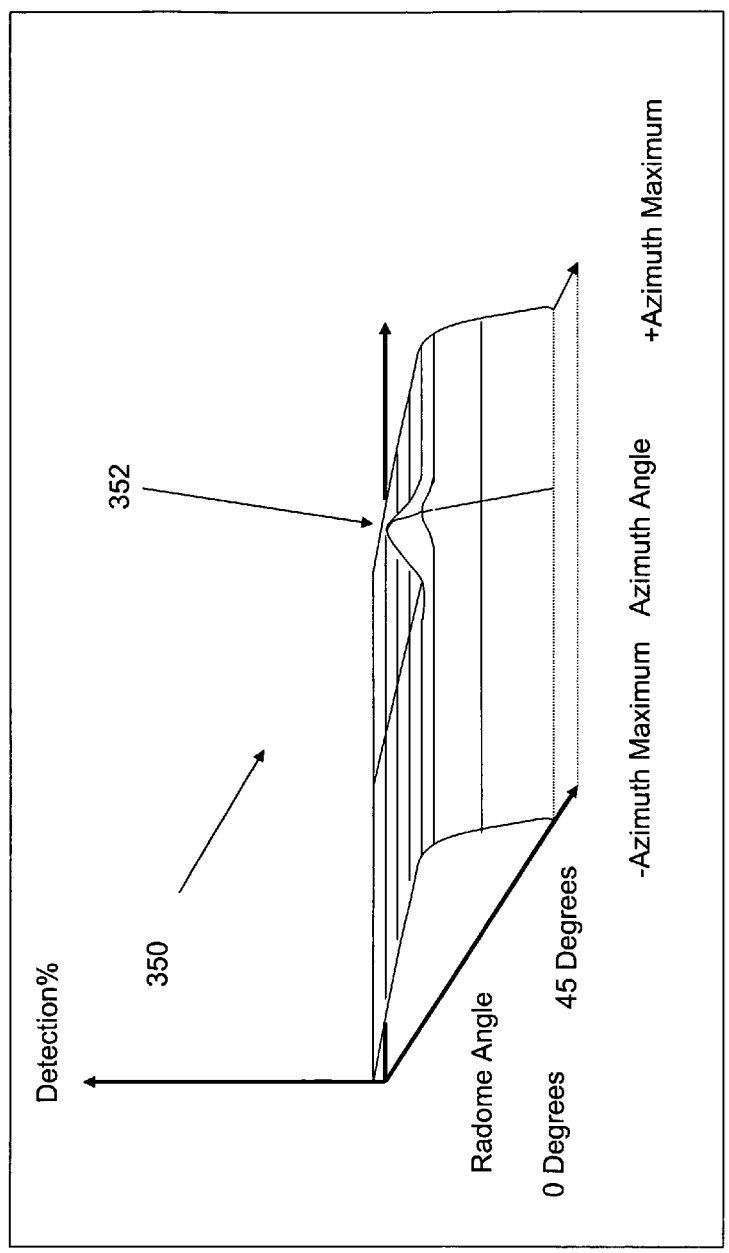
FIG. 12 is a graph showing detection percentages across radome angles and azimuth angles in accordance with an exemplary embodiment.

With reference to FIG. 12, a graph 350, similar to graph 340, includes a local maximum in the middle of the azimuth range. Applicants believe a local maximum 352 in the middle in the azimuth range indicates the azimuth angle of a spurious return.

Figure 13:
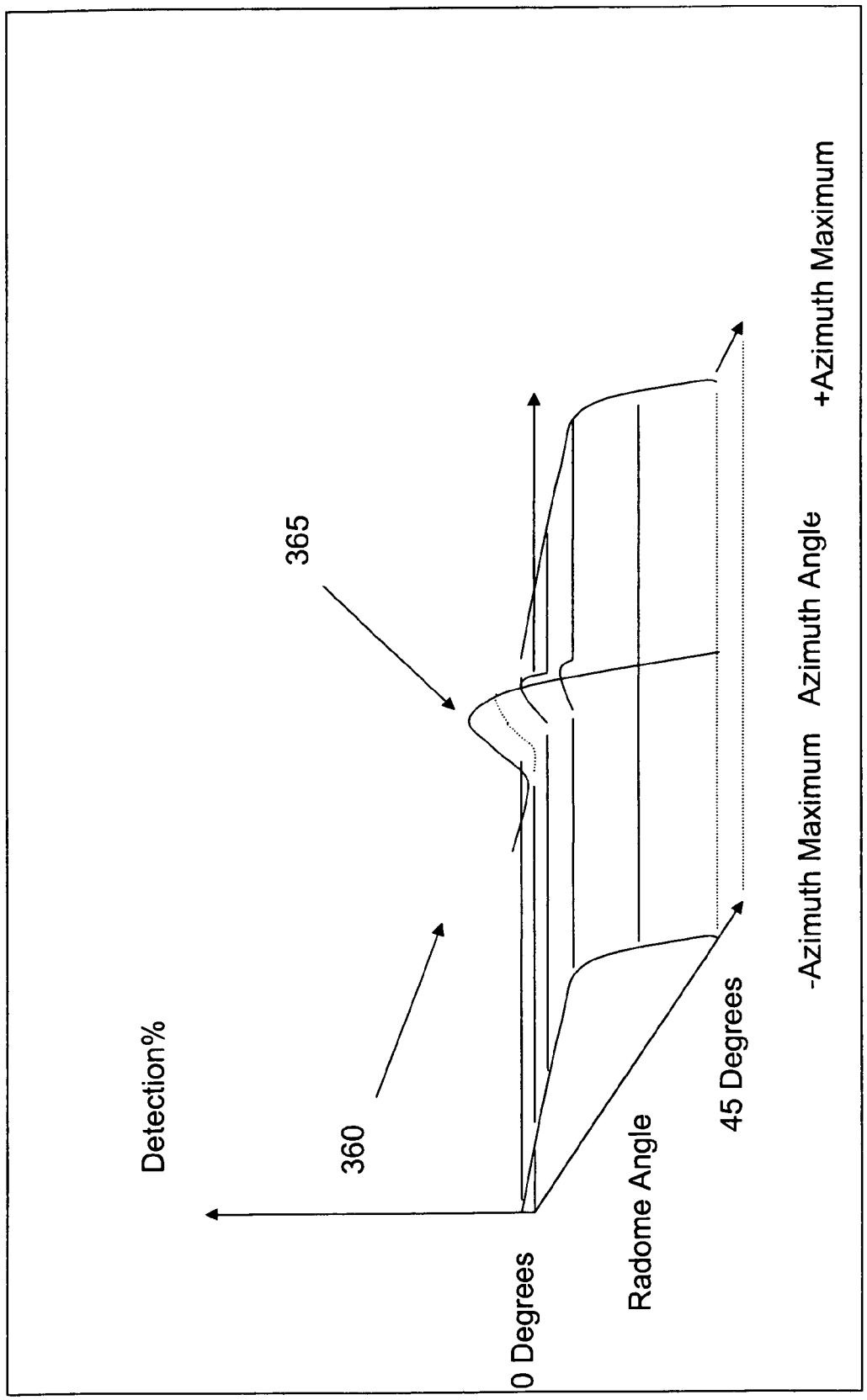
FIG. 13 is a graph showing detection percentages across radome angles and azimuth angles in accordance with an exemplary embodiment.

With reference to FIG. 13, a graph 360, similar to graph 340, shows a significant local maximum 365. Applicants believe the maximum 365 is representative of a reflection lobe response.

With reference to FIG. 13, a graph 360 is similar to graph 340 and includes a significant local maximum 365. Applicants believe maximum 365 indicates a spurious target at a range greater than an altitude range.

Average long term detection rates can be stored in memory and kept in the table associated with FIGS. 10-13. The detection may be qualified by return lengths (ground returns below the aircraft tend to a have a high length of the transmitter pulse length filtered by the match receiver filter while weather returns tend to have longer lengths). As discussed above, the detections are addressed by azimuth angle and estimated radome angle in the table. Accordingly, each radar sample can be matched to a point in the detection table if the samples azimuth angle, range, aircraft pitch, antenna tilt, and estimated radome angle is known.

A local maximum of detections at the map location in the table indicates that potential to produce a spurious lobe return. Further, the region that surrounds local maximum has the potential to produce spurious returns. The region can be defined by the azimuth width until detection values have returned to a normal range. Region range should extend longer than the range produced by the radar pulse striking the ground.

The amount of new information that is merged into the estimate of weather at a given range and azimuth angle can be made to be dependent on the mapped detection value in the table. Once a local detection maximum has been found, the region size of the possible spurious extent can be estimated.

At a given radome angle, the detection floor may be estimated. The azimuth extent of the spurious region may be estimated to have its azimuth extent limited to the where the local detection maximum falls to the estimated detection floor at the radome angle. The following equation is one method to define the detection floor.

$$\text{Detection Floor} = \frac{1}{m} \left[ \frac{1}{\sum_{\phi\, az=\phi\, min}^{\phi\, max} (POD_{\phi_{az}})^{-1}} \right] \quad \text{Equation 1}$$

where m=count of samples across several beam widths;
$POD_{\phi_{az}}$=percentage of detection at the azimuth angle; and
$\phi az$=the individual azimuth angle.

$\phi$ max points to an azimuth angle roughly one or two beam widths on one side of the azimuth angle/radome angle where the average detection rate is being detected and $\phi$ min points to data elements on the other side of the estimation space, again one or two beam widths from the beam center.

Range extent can be estimated to equal twice the range extent produced by the current transmitter pulse width. Range extent could also be computed in similar manner to the azimuth extent control law given above (e.g., Equation 1). In this case, the local averaging defining detection floor can either be taken from the azimuth detection floor calculation or computed along the radome axis angle according to Equation 2 below.

$$\text{Detection Floor} = \frac{1}{m} \left[ \frac{1}{\sum_{\phi\, radome=\phi\, min}^{\phi\, max} (POD_{\phi_{radome}})^{-1}} \right] \quad \text{Equation 2}$$

where m=Number of radome angle elements being sampled;
$POD_{\phi_{radome}}$=percentage of detection at the radome angle; and
$\phi$ radome=the radome angle index for pointing across the data space.

$\phi$ min is preferably several beam widths before and $\phi$ max is preferably several beam width after the sample where a local average is desired. If detection table resolution is about ½ beamwidth, $\phi$ min and $\phi$ max would equate to −4 to +4.

According to one embodiment, the table is used as follows. It is assumed that power has been estimated over time at a radome angle/azimuth point in space relative to the aircraft. Also, it is assumed that a new power input term is available for that same place in space mapped into a range azimuth table. The estimated power at this point can be updated according to Equation 3. The detection table is preferably organized in an azimuth/radome angle form (e.g., most likely with ½ beam width resolution). The receiver filtered power estimate is in a range/azimuth organized table and can use classic scan to scan filter memory used in a Rockwell Collins Multi Scan Hazard Detection™ system.

NewPowerEstimate=OldPowerEstimate+Beta(NewInputPower−OldPowerEstimate)     Equation 3 where Beta is a function of detection table data at the given range/azimuth cell;
Beta equals one for situations where the local detection percentage is not a local maximum; and
Beta equals 0 for situations where the local detection percentage is a local maximum in the detection table.

Beta can be a smoothly varying parameter based on the local detection percentage instead the discreet version described above. The above embodiment preferably does not allow input samples contaminated by its spurious reflection beam to contaminate the overall estimated radar return power. The process can be filter dBz or radar return power.

Radome quality may be ascertained by examining the extent of the azimuth angle/radome angle occupied by spurious responses. With the total number of table elements declared to be spurious hazards exceeds the threshold, radome 12 may be declared to be below a standard. Simple single point radome failures should influence about 4 to 6 detection table elements when table resolution is ½ beam width. If single point errors are to be mitigated while multiple errors annunciated as a radome failure, two error locations in the radome should produce 8 to 12 detection table elements as likely spurious beam generating locations. Thus, 8 to 12 or more detection table elements producing likely spurious antenna beams should produce a radome disqualification annunciation.

In a preferred embodiment, detector 24 is implemented as software modules operating on the platform associated with processor 15. Detector 24 includes a spurious response identifier module 60, a modeled consistent azimuth and elevation pairs module 62, a range determination module 64, a historical data module 68, a warning module 70, a region definition module 72, and a coast module 74. Range determination module 64 is coupled to an altitude sensor 92. Alternatively, range determination module 64 can determine altitude from another source.

While the detailed drawings, specific examples, detailed algorithms and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow chart shows a preferred exemplary operation only. The specific data types and mathematical operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. A weather radar system coupled to a display, the weather radar system comprising:
   processing electronics for sensing weather, the processing electronics configured to sense a spurious reflection associated with at least one of an antenna characteristic and a radome characteristic; and
   wherein the processing electronics causes the display to provide at least one of: visual indicia of the weather with mitigation of the spurious reflection and a warning based on the at least one of the antenna characteristic and the radome characteristic.

2. The weather radar system of claim 1, wherein the processing electronics removes the spurious reflection from weather image data, the weather image data being used to provide a display signal for the display, the display providing the visual indicia in response to the display signal.

3. The weather radar system of claim 2, wherein the processing electronics determines a region associated with the spurious reflection.

4. The weather radar system of claim 3, wherein an altitude of an aircraft is utilized to determine the region.

5. The weather radar system of claim 4, wherein the processing electronics determines azimuth and elevations pairs to determine the region.

6. The weather radar system of claim 5, wherein the region is determined based on comparing an aircraft velocity reference to environmental flow velocity, response length, and analysis of azimuth/elevation and range at the altitude.

7. The weather radar system of claim 1, wherein the weather includes first weather near a region, wherein the first weather is stored and the visual indicia is provided including predicted weather in the region using the first weather.

8. The weather radar system of claim 7, wherein the visual indicia within the region is generated according to a coasting algorithm.

9. The weather radar system of claim 1, wherein the display includes a mitigation mode and a normal mode.

10. A method of displaying weather on a display associated with an aircraft weather radar system, the method comprising:
    receiving radar returns at a plurality of tilt angles;
    processing the radar returns to determine a presence of weather and to provide at least one of: mitigating the effects of spurious returns caused by at least one of an antenna characteristic and a radome characteristic and providing a warning related to the spurious returns caused by the at least one of the antenna characteristic and the radome characteristic; and
    displaying the weather.

11. The method of claim 10, wherein processing the radar returns includes determining a region associated with the spurious returns and preventing the spurious returns from being displayed.

12. The method of claim 11, wherein an altitude of an aircraft is utilized to determine the region.

13. The method of claim 10, wherein the warning is based on at least one of an area, a peak reflectivity and an average probability being above a threshold.

14. The method of claim 10, wherein the processing the radar returns includes determining a region associated with the spurious returns and using historical data to provide indicia of the weather in the region.

15. The method of claim 14, wherein the indicia is provided in response to a coast algorithm.

16. An apparatus for displaying weather for an aircraft, the apparatus comprising:
    means for transmitting radar signals and receiving radar returns;
    means for providing weather data derived from the radar returns;
    means for determining spurious reflections associated with at least one of an antenna characteristic and a radome characteristic; and
    means for warning when the spurious reflections are above a threshold.

17. The apparatus of claim 16, wherein the means for determining spurious reflections is implemented using software.

18. The apparatus of claim 16, further comprising:
    means for removing data associated with the spurious reflections from the weather data;
    means for providing a display signal associated with the weather data;
    means for displaying an image representing the weather in response to the display signal; and
    wherein the means for removing defines a region associated with the spurious reflections and removes the data in the region.

19. The apparatus of claim 18, wherein an altitude of the aircraft is used to define the region.

20. The apparatus of claim 16, wherein effects of the spurious reflections are removed from the weather data.

* * * * *